Aug. 18, 1964 S. J. ZUCCARO 3,145,307

LOGICAL CIRCUITS

Filed May 22, 1961

SALVATORE J. ZUCCARO
INVENTOR.

BY Lyon & Lyon

ATTORNEYS 3,145,307
Patented Aug. 18, 1964

3,145,307

LOGICAL CIRCUITS

Salvadore J. Zuccaro, Los Angeles, Calif., assignor to Ampex Corporation, Culver City, Calif., a corporation of California Filed May 22, 1961, Ser. No. 111,680
3 Claims. (Cl. 307—88)

This invention relates to magnetic-core logic circuits and, more particularly, to improvements therein.

An object of this invention is the provision of improved ciruits for performing logical functions which employ core diodes made of magnetic material and preferably having a rectangular magnetic hysteresis characteristic.

Another object of this invention is the provision of novel circuitry for performing logical functions which employ magnetic-core diodes made of magnetic material and preferably having a rectangular magnetic hysteresis characteristic.

Yet another object of this invention is the provision of novel circuitry for performing logical functions which employ magnetic toroids having substantially rectangular magnetic hysteresis characteristics.

Still another object of this invention is the provision of circuits for performing logical functions which are simpler and more inexpensive to fabricate than those available heretofore.

The above objects of the invention may be achieved in a coincidence, or AND gate, type of logic, in which an output occurs only when all inputs to the AND gate circuit are present, by providing a magnetic toroid for each one of the inputs and a single output magnetic toroid core. Two alternately operable clock driver circuits are provided, respectively designated as an odd driver circuit and an even driver circuit. The odd driver circuit applies current pulses to a winding coupled to all cores except the output core. The even driver circuit applies current pulses to a winding coupled to the output core. The odd driver circuit resets all of the output cores to the zero-representative state of magnetic remanence; the even driver circuit, which operates after the odd driver circuit, resets the output core to the zero-representative state of magnetic remanence.

An input applied to any one or more of the magnetic cores, but to less than all of the magnetic cores, tends to drive those cores to their "one" state of magnetic remanence. However, in view of the coupling of output windings between each one of these cores and the output core, none of these cores can actually be driven to their one state. Upon application of inputs to all of the cores simultaneously, all of the cores can be driven to their one state of magnetic remanence. It should be noted that inputs are applied to this circuit only during the even clock drive time. Upon the next operation of the odd drive circuit, the output core is driven to its one state and the input cores are all returned to their zero states of magnetic remanence. The succeeding even-driver circuit operation drives the output core to its one state, whereupon an output is received indicative of the fact that all the inputs were received simultaneously.

Another embodiment of the invention is the provision of a logic circuit, designated as a NOT circuit, wherein an output is received solely if no input has been received. This embodiment of the invention employs an input and an output magnetic toroidal core and an odd and an even driver circuit similar to the ones described. The odd driver circuit is coupled to both cores, so that it drives the input core to its zero state of magnetic remanence and the output core to its one state of magnetic remanence. The even driver circuit drives the output core back to its zero state of magnetic remanence. Thus, with no input applied to the input core, an output signal will always be derived from the output core upon the operation of the even driver circuit. An input applied to the input core drives the input core to its one state of magnetic remanence. This input is always applied during the even-clock-pulse interval. The odd driver circuit then applies a drive to both cores, in response to which the input core will go from its one to its zero state of magnetic remanence, which prevents the output core from being driven to its one state of magnetic remanence. Thereafter, upon the drive to the second core being received from the even driver circuit, since the output core is already in its zero state of magnetic remanence, no output pulse is derived from this core.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
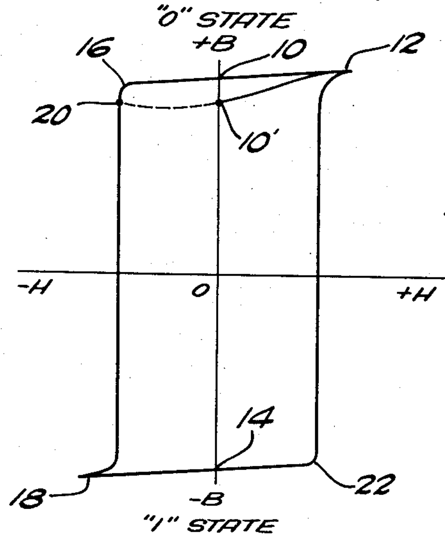
FIGURE 1 represents a preferred magnetic hysteresis characteristic of the toroidal cores, which are employed in the embodiment of this invention.

Reference is now made to FIGURE 1, which is a drawing of a rectangular magnetic hysteresis characteristic which is preferred for magnetic cores which are employed in accordance with this invention. Cores having substantially this characteristic are commercially available. The point 10 on the characteristic curve represents positive magnetic saturation. When cores are at this portion of the characteristic, they may be considered in their zero state of magnetic remanence. The application of a magnetomotive force to drive the core further into its positive state of saturation will take it up to point 12 on the characteristic curve, and, upon removal of the drive, the core will return to the point 10.

In order to drive this magnetic core to saturation at the opposite state of magnetic remanence, represented by point 14 on its characteristic curve (the one state), it is necessary to apply a magnetomotive force in the negative direction. This will carry the core out to point 16 on the characteristic curve, but such drive, in order to carry the core all the way down to point 18 on the characteristic curve from whence it will subside to point 14, must be sufficient to carry the core beyond point 20 on the characteristic curve.

A core which is at point 14 of its characteristic curve, or in the one state, must be driven positively to attain its zero state and will traverse the path shown by the characteristic curve between points 14 and 22, then up to point 12, from which it will subside to point 10.

Figure 2:
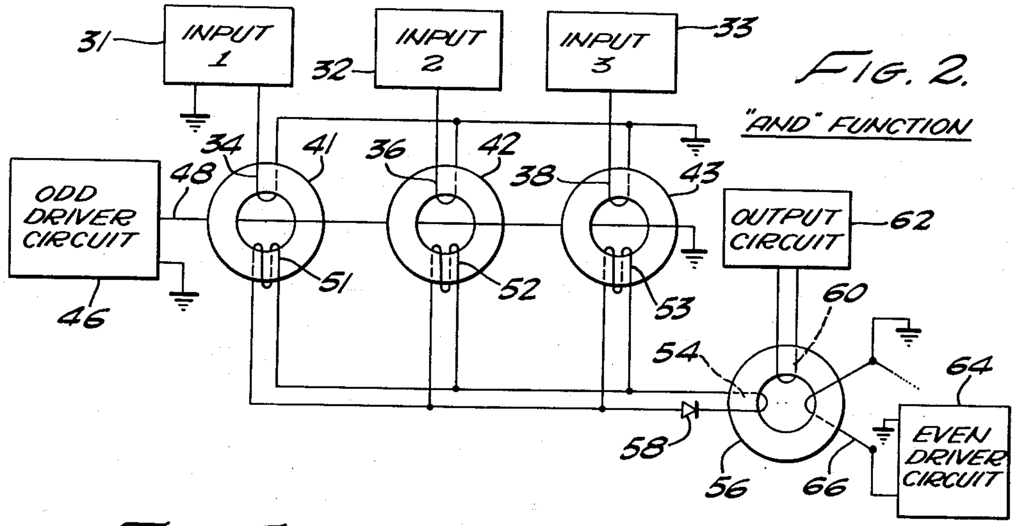
FIGURE 2 is a circuit diagram of an embodiment of the invention suitable for performing AND functions.

FIGURE 2 shows a circuit diagram of an embodiment of the invention for carrying out the AND function. By way of example, an AND function with three inputs is shown. Two, or more than three, may be employed, if desired. The number selected is to be considered as exemplary, and not as a limitation upon the invention. For each input-signal source, respectively 31, 32, 33, there is provided a toroidal magnetic core, respectively 41, 42, 43. The input-signal source 31 applies signals to an input winding 34, which is coupled to the toroidal core 41 by being wound through its major aperture. The input-signal source 32 applies signals to an input winding 36, which is coupled to the toroidal core 42 by being wound through its major aperture. The input-signal source 33 applies signals to an input winding 38, which is coupled to the magnetic core 43 by being wound through its major aperture. An odd driver circuit 46 applies current pulses to a clear winding 48, which is inductively coupled to all the cores 41, 42, 43, by being wound through their major apertures.

Each one of the cores 41, 42, 43 has an output winding, respectively 51, 52, 53, which has more turns than the input winding on that core, or of any of the other cores. Each one of these output windings is connected to a transfer winding 54, which serves as the input winding for an output core 56. This input winding has connected in series therewith a diode 58. The transfer winding 54 is inductively coupled to the output core 56 by being wound thereon through its major aperture.

An output winding 60 is inductively coupled to the output core 56 by being wound thereon through its major aperture. The output winding 60 is connected to an output circuit 62, which utilizes the output signal induced in the output winding from the core 56. An even driver circuit 64 applies current pulses to an even driver winding 66, which is inductively coupled to the output core 56. These current pulses tend to drive the output core to its zero state of magnetic remanence. The even driver circuit and the odd driver circuit operate alternatively in well-known fashion to apply current pulses to the respective drive windings 48, 66.

Inputs to the circuit shown in FIGURE 2 are received only during the time that pulses are received from the even driver circuit 64. With no inputs being applied to the input windings 41, 42, 43, repeated odd and even drive pulses leave cores 41, 42, 43, and 56 in the zero states, or at point 10 on the curve shown in FIGURE 1. Each of the odd driver pulses will drive cores 41, 42, and 43 out to point 12 on the hysteresis curve, from whence they will return to point 10 upon removal of the drive. Core 56 is driven to point 12 on the characteristic curve, from which it returns to point 10 upon the removal of the even drive.

Assume now that input 31 is activated to apply a current pulse to input winding 34. This will tend to drive the magnetic core 41 towards its one state of magnetic remanence. As as result, a voltage is induced in the output winding 51, which is effectively short-circuited by the loading windings 52 and 53, which are effectively connected thereacross, whereby a current flows through winding 51, which is sufficiently large to prevent the magnetic core 41 from being driven to its one state. It should be noted that the output windings have more turns than the input windings to assist in generating a back magnetomotive force which has the effect described. Current from the input-pulse signal sends core 41 to point 16 on its characteristic curve, and the loading effect of the other windings on the output winding keeps the flux change from going beyond point 20. At the end of the input pulse, core 41 falls back to point 10′ of its characteristic curve. Subsequently, upon the application of an odd drive current pulse, the core is returned to point 10.

Inputs to one or more of the input windings, but not to all, cause an operation of the type which has been described—namely, a back magnetomotive force is induced in the output windings of the cores which are excited or driven partially, which prevents their being completely driven to their one state. However, when there are inputs into all of the input windings, the change in flux generated by the cores induces a voltage in all of the output windings simultaneously. Since each winding sees an equal voltage, despite the parallel connections, there is no loading effect, and therefore all of the cores can by driven to point 14 on the hysteresis characteristic curve, or to the state of magnetic remanence representing a one. The voltage generated has a polarity which back-biases the diode 58, and thus no current flows in the transfer winding 54.

Then next odd drive current pulse occurring after the input to the cores 41, 42, 43 drives all the cores back to their zero state of magnetic remanence. Referring to the characteristic curve in FIGURE 1, this drive is from point 14 to point 22 to point 12, from which point the cores will fall back to point 10 when the odd drive pulse is removed. This causes a voltage to be induced in each one of the output windings 51, 52, 53, which has a polarity which can pass through the diode 58 and thus cause a current flow in the winding 54, which drives the core 56 to its one state of magnetic remanence. The next current pulse received from the even driver circuit drives the core 56 to its zero state of magnetic remanence, whereupon a voltage will be induced in the output winding 60, which can be utilized in the output circuit 62.

Figure 3:
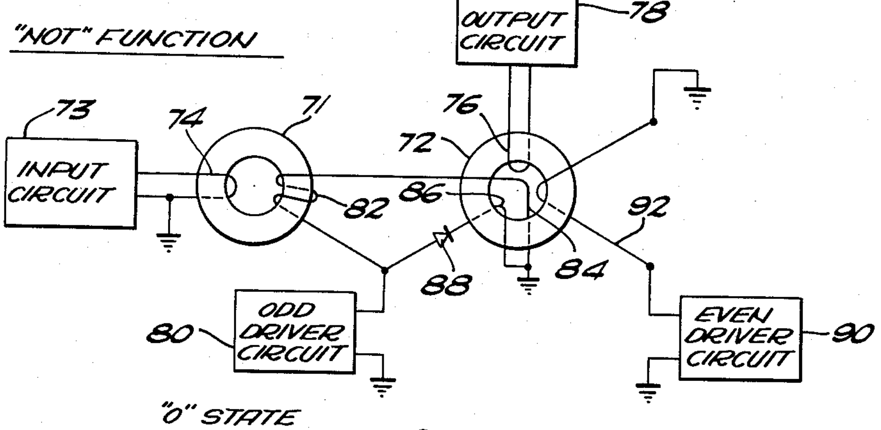
FIGURE 3 is a circuit diagram of an embodiment of the invention suitable for NOT functions.

FIGURE 3 shows an arrangement for performing a NOT function of logic. This is the type of circuit which is employed for providing an output signal when no input is received, and, vice versa, for providing no output signal when an input is received. The circuit includes two magnetic cores 71, 72. An input circuit 73 is employed to drive input winding 74, which is inductively coupled to the core 71 by being passed through its major aperture. An output winding 76 is inductively coupled to the core 72, passing through its major aperture and then being connected to an output circuit 78, which can utilize signals induced therein. An odd driver circuit 80 applies current pulses to a winding having serially connected sections. One section 82 has turns wound on core 71 and the second section 84 is inductively coupled to core 72 in an opposite sense to the coupling of section 82 on core 71. The second section 84 is then connected to ground. Another winding 86 includes a diode 88, which is connected in series therewith. This winding 86 is connected in parallel with the winding made of sections 82, 84, and is also inductively coupled to the core 72, but with a polarity opposite to the coupling to the core of the winding section 84.

An even driver circuit 90 provides current pulses to a drive winding 92, inductively coupled to the core 72. The even driver circuit operates alternatively with the odd driver circuit 83. Any input which is applied to the core 71 from the input circuit 73 is received during the time the even driver circuit 90 is operative.

Initially, the even driver circuit 90 operates to apply a current pulse over the input winding 92 to drive core 72 towards its zero state of remanence, which is at point 10 on the characteristic curve. Thereafter, when no input has been received from the input circuit 73, upon the operation of the odd driver circuit, because of the presence of the diode 88, a negligible amount of current flows through the winding section 86, and the remaining current flows through the winding sections 82 and 84, which tend to drive the core 71 to the zero state of magnetic remanence and core 72 to its one state of magnetic remanence. As a result, a voltage is induced in the output winding 76, which is utilized by the output circuit 78.

The next operation of the even driver circuit will drive the core 72 to its zero state of magnetic remanence, which causes an output signal to be induced in the output winding 76. Any input applied to the winding 74 from the input circuit 73 during even clock time drives the core 71 to its one state of magnetic remanence. Any voltage induced in the winding 82 as a result of this drive does not affect the core 72, since it is back-biased by the diode 88 to the state of remanence in which it already is. The next current pulse from the odd-driver circuit drives core 71 to its zero state of magnetic remanence. Thereby, a voltage is induced in the winding 82, which causes current to flow in a path including the winding section 84 and also the winding 86. The effect of the current flow through the winding 86 is to overcome the effect of the current flow in the winding section 84. Thus, as a result, core 72 is not driven to its one state, but remains in a zero state. No output voltage is induced in the output winding 76 upon the occurrence of the next even-driver current pulse. Thus, the NOT function is accomplished by this circuit, by reason of the fact an output is not provided in response to an input and is provided when there is no input.

There has accordingly been described and shown herein arrangements for carrying out logical functions employing magnetic cores and windings thereon.

I claim:

1. A logic device comprising a first, second, and third magnetic core each having two states of magnetic remanence and being drivable therebetween, means for applying magnetomotive forces alternately to said first and second cores and to said third core to drive them to one of said two states of magnetic remanence, separate means for applying a magnetomotive force to each of said first and second cores to drive them toward their other state of stable magnetic remanence, an output winding coupled on each of said first, second, and third cores, means connecting the output windings of said first and second cores in parallel for allowing said first and second cores to be driven to their other state of magnetic remanence only upon simultaneous operation of all said separate means, and means for applying output from said first and second cores when they are driven from their other to their one state of magnetic remanence to said third core to drive it to its other state of magnetic remanence.

2. A logic device comprising a plurality of input magnetic cores, and an output magnetic core, each of said input and output cores having substantially rectangular characteristics with two states of magnetic remanence, means for applying magnetomotive forces alternately to all of said input cores and to said output core for driving said cores to one of their two states of magnetic remanence, separate means for applying magnetomotive forces to each of said input cores to drive an input core to its other state of magnetic remanence, an output winding on each of said input cores, means connecting said output windings together for permitting said input cores to be driven to their other state of magnetic remanence only in the presence of a simultaneous magnetomotive drive to all of said input cores, an input winding on said output core, means connecting all said output windings to said input winding, and an output winding on said output core.

3. A logic device comprising a plurality of input magnetic cores and an output magnetic core, each of said input and output cores having substantially rectangular characteristics with two states of magnetic remanence, a separate input winding inductively coupled to each of said input magnetic cores, a separate output winding inductively coupled to each of said input magnetic cores, a transfer winding inductively coupled to said output magnetic core, means coupling all of said output windings to said transfer winding including a pair of terminals to which all said output windings are connected in parallel, a diode connected between one end of said transfer winding and one of said pair of terminals, and a connection between the other of said pair of terminals and the other end of said transfer winding, a first clear winding inductively coupled to all said input magnetic cores, a second clear winding inductively coupled to said output core, means for applying current pulses alternately to said first and second clear windings for driving said cores coupled to said respective first and second clear windings to one of their two states of magnetic remanence, means for applying input signals to said input windings for driving said cores toward the other of said states of remanence, and an output winding on said output core wherein an output is induced only after an input has been applied to all said input windings.

References Cited in the file of this patent

UNITED STATES PATENTS

| | | |
|---|---|---|
| 2,742,632 | Whitely | Apr. 17, 1956 |
| 2,889,543 | Bloch | June 2, 1959 |
| 2,904,780 | Meyerhoff | Sept. 15, 1959 |
| 2,971,098 | Bobeck | Feb. 7, 1961 |

OTHER REFERENCES

IBM Technical Disclosure Bulletin, April 1959, pp. 35–36.

IBM Technical Disclosure Bulletin, August 1960, p. 57.